United States Patent [19]

Mester et al.

[11] Patent Number: 5,654,772

[45] Date of Patent: Aug. 5, 1997

[54] METHOD FOR CHANGE DETECTION IN MOVING IMAGES

[75] Inventors: Rudolf Mester, Hildesheim; Til Aach, Aachen, both of Germany

[73] Assignee: Robert Bosch GmbH, Stuttgart, Germany

[21] Appl. No.: 360,715

[22] PCT Filed: Apr. 7, 1994

[86] PCT No.: PCT/DE94/00385

§ 371 Date: Dec. 12, 1994

§ 102(e) Date: Dec. 12, 1994

[87] PCT Pub. No.: WO94/24634

PCT Pub. Date: Oct. 27, 1994

[30] Foreign Application Priority Data

Apr. 10, 1993 [DE] Germany .................. 43 11 972.7

[51] Int. Cl.$^6$ .................................................. H04N 7/18
[52] U.S. Cl. .......................................................... 348/700
[58] Field of Search .......................... 348/207, 220, 348/700, 701, 402, 409–413, 415, 416, 420, 699; H04N 7/18

[56] References Cited

U.S. PATENT DOCUMENTS

| | | | |
|---|---|---|---|
| 4,992,870 | 2/1991 | Samad | 348/700 |
| 4,999,614 | 3/1991 | Ueda et al. | 348/700 |
| 5,027,205 | 6/1991 | Avis et al. | 348/700 |
| 5,091,925 | 2/1992 | Haendle et al. | 348/700 |
| 5,103,305 | 4/1992 | Watanabe | 348/700 |
| 5,134,472 | 7/1992 | Abe | 348/700 |
| 5,402,185 | 3/1995 | De With et al. | 348/700 |
| 5,404,174 | 4/1995 | Sugahara | 348/700 |
| 5,420,638 | 5/1995 | Riglet et al. | 348/700 |
| 5,436,674 | 7/1995 | Hirabayashi et al. | 348/700 |

FOREIGN PATENT DOCUMENTS 0 515 890 A2  12/1992  European Pat. Off. .
2 093 320  9/1990  Japan .

OTHER PUBLICATIONS

J.O. Limb et al., "Combining Intraframe and Frame-to-Frame Coding for Television", *The Bell System Technical Journal*, vol. 53, No. 6, Jul.–Aug. 1974, pp. 1137–1173.

D.J. Connor et al., "A Frame-to-Frame Picturephone Coder for Signals Containing Differential Quantizing Noise", *The Bell System Technical Journal*, vol. 52, No. 1, Jan. 1973, pp. 35–51.

Carnimeo et al., "Room Monitoring Using Intraframe Adaptive Filtering Applied to Image Differences", *Automazione E Strumentazione*, No. 4, Apr. 1990, pp. 125–128 (Abstract only translation).

A Gerhard, "Motion Analysis in the Coding of Image Sequences", Dissertation, Munich Institute of Science and Technology, 20 Sep. 1988, pp. 66–70, 192–198 (no translation).

*Primary Examiner*—Tommy P. Chin
*Assistant Examiner*—Richard Lee
*Attorney, Agent, or Firm*—Kenyon & Kenyon

[57] ABSTRACT

A method and system for detecting changes in moving images, wherein the system includes an image pick-up unit (3), an arithmetic unit (1), and a storage device (2). The image pick-up unit (3) records images by pixels. The arithmetic unit (1) files the video signals by pixels in the storage device (2). The arithmetic unit (1) calculates the change in the video signals of the blocks of the image n+1 with reference to the preceding image n. Different values are assigned to the blocks depending on whether the change is larger or smaller than a threshold, i.e., depending on whether the blocks are supposed to be treated further as changed or not changed. The threshold becomes all the lower the more adjacent blocks that have been designated as changed when compared to their thresholds.

9 Claims, 2 Drawing Sheets

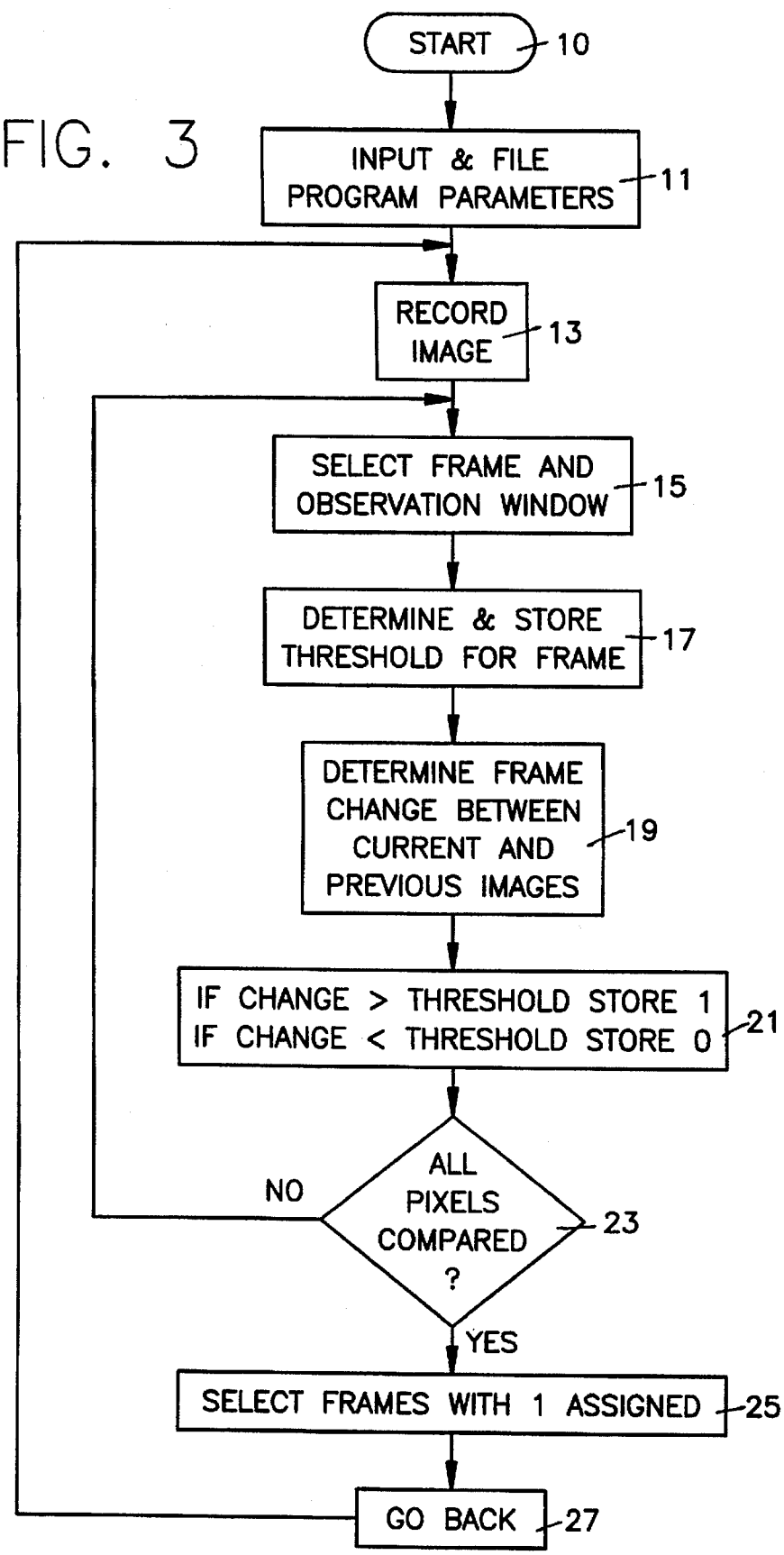

METHOD FOR CHANGE DETECTION IN MOVING IMAGES

FIELD OF THE INVENTION

The present invention relates to a method for detecting changes in moving images, particularly to a method for detecting changes in electronically recorded moving images.

BACKGROUND INFORMATION

One field of application for detecting changes in moving images is traffic surveillance and safety engineering. By detecting changed image areas, one can automatically detect moving objects, such as vehicles in the case of an automatic traffic surveillance, or recognize unauthorized penetration in the case of object protection.

One method for detecting changes in moving images consists in segmenting an image into moving objects and a stationary background. In this method, the moving objects are treated as contiguous frames, whose movement can be described by a motion vector or a set of motion vectors.

Methods are already known, wherein the change in the video signals is compared picture element by picture element to a threshold, and the video signals are then designated as changed or unchanged. The threshold is determined according to A. Gerhard, "Motion Analysis in the Coding of Image Sequences" in the dissertation for the Communications Engineering Chair at the Munich Institute of Science and Technology Sep. 20, 1988, p. 69, in that a local value of a low-pass filtered and scaled version of a differential image, which is determined from the current image and the image that preceded in time, is subtracted from a reference threshold. The information on whether a picture element had been designated as changed or unchanged is filed in a binary mask.

However, to achieve contiguous, closed frames in accordance with this method, it is necessary to reprocess the binary mask in a further step. To this end, one applies such methods as linear filtering, erosion and dilatation, and surface-area growth.

A method for detecting moving objects is also described by D. J. Conner in "A Frames-to-blocks Picturephone Coder For Signals Containing Differential Quantizing Noise", ATT Bell System Technical Journal, vol. 52, no. 1, 1973, p. 36, et seq. This method makes use of a vertically averaged image differential signal and of an image differential signal that is compensated with respect to noise and is averaged over a surface area.

With the help of the vertically averaged image differential signal, it is first decided whether a moving edge, i.e., a moving object has been recognized, and a flip-flop is set to 1. This flip-flop is only set to 0 again, i.e., the pixel being considered is identified as a stationary object, when, in a block of 8×3 pixels, an accumulator counts fewer than a prescribed number of pixels whose image differential signal lies above a threshold of $T_2$ or $T_3$.

SUMMARY OF THE INVENTION

The method in accordance with the present invention for detecting changes in moving images has the advantage that the threshold, to which the change in the video signals is compared, is established in dependence upon the surroundings of the video signals to be decided upon. In so doing, both the temporal as well as the spatial surroundings of a block to be decided upon are considered. The threshold becomes all the lower, the more adjacent blocks have already been designated as changed when compared to their threshold. Here, the fact is taken into consideration that the probability that a block changes when its surroundings change is great, and the probability that a block changes when its surroundings do not change is small.

It is also significant that the comparison to the threshold is made on the basis of a quantity which is calculated from the picture-element variations in a plurality of pixels. Such a quantity is encumbered by substantially fewer statistical fluctuations and, thus, leads to a reliable decision.

A further advantage is that blocks of the preceding images are also used in determining the threshold. In this manner, the certainty of correctly designating a block as changed or not changed increases, since a change in a block not only depends on the adjacent blocks, but also on the frames of preceding images.

It is furthermore advantageous that a change or no change in a block does not have to be ascertained individually for all pixels of a block, but rather can be assigned to larger detection cells. In this manner, the method of the present invention is accelerated without any significant loss of quality in the binary decision mask.

It is particularly advantageous that in determining the threshold, the results of the comparisons made between the changes in the blocks contained in the observation window and their thresholds are considered, while being variably weighted according to spacing and orientation with respect to the block to be compared. In this manner, it is possible to determine the threshold in dependence upon larger surroundings, temporal and spatial intervals to the block to be decided upon being considered, weighted according to their position and thus to their meaningfulness as to the probability of a change or no change in the block to be decided upon.

The change in a block is determined directly by subtracting the video signals of the block to be decided upon and the video signals of the identically arranged block of an image that preceded in time, from one another, and by evaluating this image difference.

The decision whether an image area is to be regarded as changed can be made for single picture elements or for contiguous blocks of pixels, depending on whether one places greater importance on high spatial resolution or low computational expenditure.

Preferably, the sum of the squared differences of the video signals within one block, which are related to the output (variance) of the camera noise in the differential image (differential camera noise process), can be considered as a change in the video signals of successive images. This scaling permits an adaptation to the most widely varying, differently noisy image sequences.

Alternatively, one can also use the sum of the absolute values of the picture-element differences.

One advantageous configuration of the observation window consists of the block to be compared and the adjacent blocks. Thus, the surroundings next to the block to be compared, which can indicate the most about the probability of a change or lack of change in the block, are considered in determining the threshold.

In determining the threshold, it is advantageous to not only consider those blocks designated as belonging to the same image as the block to be decided upon, but also to use those blocks of the preceding image that are identically arranged in the image plane and that have already been compared to a threshold. In this manner, the development of a block over time is considered in determining the threshold.

One special specific embodiment of the method consists in considering the result of the comparison of the block, which is arranged identically in the image plane with respect to the block to be compared, with its threshold of at least one preceding image. Here, it is taken into consideration that a video signal whose surroundings have not changed for quite some time is more likely to continue not to change, and a video signal whose surroundings have changed often already in preceding images is more likely to change again.

An important feature of the method of the present invention is that the threshold is created from a fixed component and a variable component, which is determined in dependence upon the results of the comparisons of the blocks contained in the observation window with their thresholds.

The method of the present invention can be simplified by using only one subset of the video signals contained in the block when the determination is made about the change in a block. In this manner, computational time is reduced without any significant loss in the quality of the binary mask.

BRIEF DESCRIPTION OF THE DRAWINGS

FIG. 3 is a flow-chart representation of the method of the present invention.

DETAILED DESCRIPTION

Figure 1:
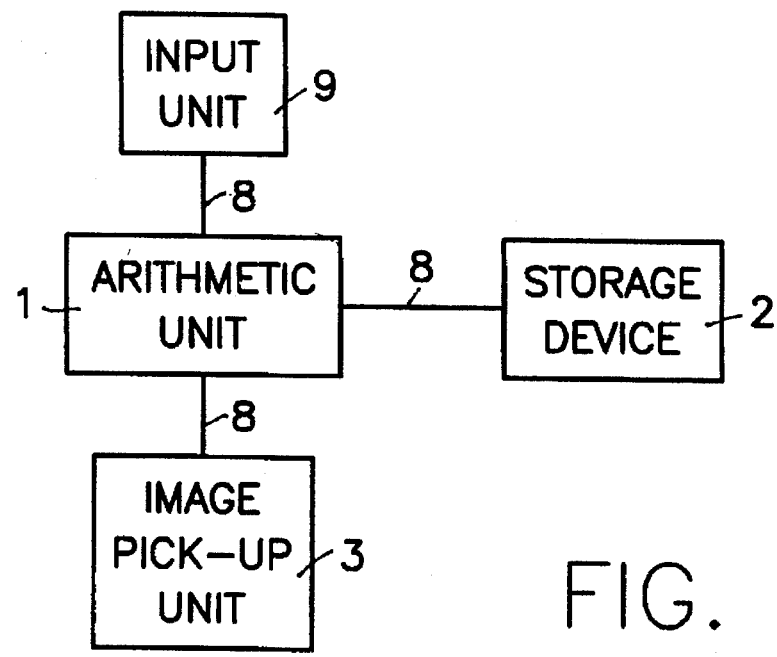
FIG. 1 is a block diagram of a system for recording and evaluating video signals in accordance with the present invention.

FIG. 1 depicts an arithmetic unit 1, which controls an image pick-up unit 3, for example a video camera, via data lines 8 and files the image data recorded by the video camera in a storage device 2. The arithmetic unit 1 files the recorded images by pixels in the storage device 2. In addition, FIG. 1 shows an input unit 9, which is linked to the arithmetic unit 1 to input data via data lines 8.

Figure 2:
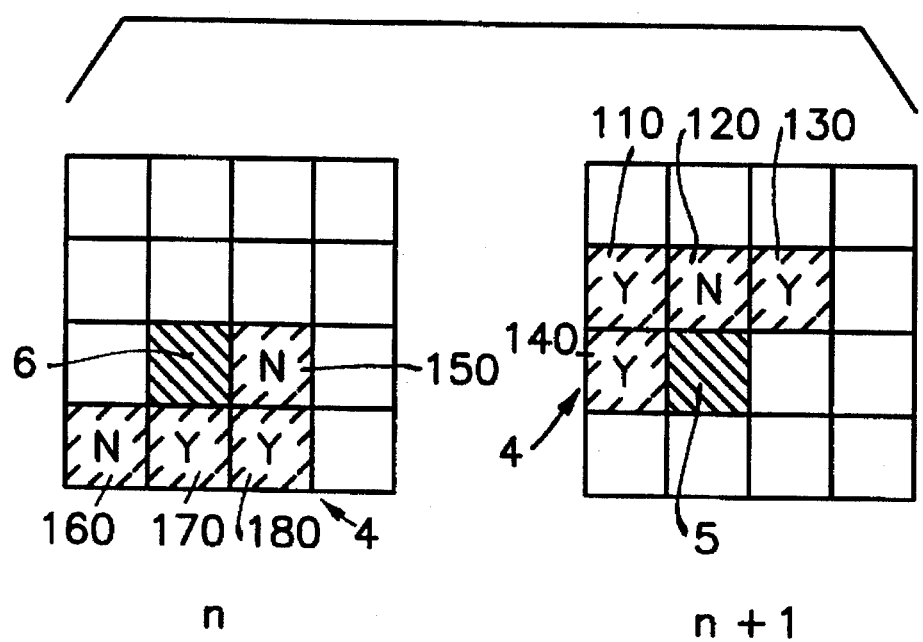
FIG. 2 depicts two successive images with an observation window extending over both images.

FIG. 2 shows two images designated n and n+1 which succeed one another in time, each of the images being segmented into 16 square blocks. In the raster of the image n+1, the block 5 to be decided upon is darkly shaded. In the image n that precedes in time, the block 6, which is arranged identically to the block 5 to be decided upon that preceded in time in image n, is darkly shaded.

In this example, the chosen observation window 4 of the image n+1 is shaded and is comprised of the blocks 110, 120, 130, and 140, which border on the block 5 to be decided upon and have already been compared to a threshold. The results of the comparisons of the blocks are entered in FIG. 2 with Y for "changed" and with N for "not changed". In this chosen method, the blocks are compared in rows, from left to right and from top to bottom, with a threshold.

Therefore, the observation window 4, which is drawn in with the shaded border in image n+1 and is comprised of the three blocks 110, 120, and 130 situated above the block to be decided upon and of the frame 140 situated to the left next to the block 5 to be decided upon, results for the frame 5 to be compared. The block bordering to the right of block 5 to be decided upon and the adjacent blocks in the following row cannot be considered in determining the threshold, since they have not yet been compared to a threshold at that point in time. To compensate for this lack of information, the shaded blocks 150, 160, 170, and 180 in the image n that preceded in time are considered as part of the observation window 4 in determining the threshold. It is a question in this case of blocks of the previous image n, for which a decision with respect to a threshold had already been made and whose result is entered in each block with Y for "changed" and N for "not changed".

FIG. 3 shows a schematic program run for the method of the present invention. The program starts at programming point 10. At the programming point 11, parameters required for the execution of the program are entered via the input unit 9 and filed by the arithmetic unit 1 in the storage device 2: the raster for segmenting the images into blocks, the quantity, i.e., the number, of pixels per block, the size of the observation window 4, and the procedure, i.e., how the blocks of the entire image are compared to a threshold. The method for calculating the change in a block i.e., the calculation of the threshold from the results of the comparisons of the blocks contained in the observation window is likewise read in and filed in the storage device. At the programming point 13, the image pick-up unit 3 records an image and the arithmetic unit 1 files the recorded image by pixels in the storage device 2. At the programming point 15, the arithmetic unit 1 chooses the first block and the corresponding observation window. At the programming point 17, from the results of the comparisons of the blocks situated in the observation window 4 and of the calculation method input via the input unit 9, the arithmetic unit 1 determines the threshold to be used for the block 5 to be decided upon and files it in the storage device 2. At the programming point 19, the arithmetic unit 1 determines the change between the video signals of the block to be compared and the video signals of the identically arranged block 6 of the preceding image. The arithmetic unit 1 then compares the ascertained change with the threshold filed in the storage device 2. At the programming point 21, the arithmetic unit 1 assigns a 1 to the storage addresses of the pixels of the compared block 5 when the change is greater than the filed threshold, and a 0 when the change is smaller than the filed threshold. At the programming point 23, the arithmetic unit 1 checks whether all pixels have been compared to a threshold. If this is not the case, then operation returns to programming point 15, and a further block 5 to be decided upon and the corresponding observation window 4 are selected by the arithmetic unit 1 from the video signals filed in the storage device 2, and the programming points 17 through 23 are run through repeatedly. The programming points 15, 17, 19, 21 and 23 are executed repeatedly until all pixels have been compared to a threshold. If the query at programming point 23 reveals that all pixels have been compared to a threshold, then operation branches over to programming point 25.

At the programming point 25, the arithmetic unit 1 chooses those blocks of the image n+1 to which a 1 had been assigned. In this manner, the arithmetic unit 1 determines moving objects or blocks which can be used to further evaluate the image. After programming point 25, operation returns to programming point 13, and the program sequence, as described, is run through again.

The preferred exemplary embodiment of the present invention is clarified in greater detail on the basis of FIGS. 1 through 3. The program is executed in accordance with the flow-chart in FIG. 3. The program is started at the programming point 10, and the initial conditions for the program are established at the programming point 11 by way of the input unit 9. In this selected example, the image is segmented into blocks, each comprised of five times five pixels. The observation window 4 is made up of the blocks bordering on the block 5 to be decided upon.

If no decisions with respect to a threshold are at hand for adjacent blocks of the same image, then the method falls back upon the corresponding blocks of the image n that preceded in time. One way to expand upon the method is to configure the observation window 4 from blocks of a plurality of images that succeed one another in time. It is established that the blocks are processed from the left to the right and from the top to the bottom. The sequence in which the blocks are processed can also vary depending upon the application at hand.

The following statistic is defined for the change in the video signals from one block to the next:

$$\Delta_k = (1/s^2) \sum_i d_i^2,$$

the sum extending over all pixels i of the block 5 to be decided upon, and $d_i$ being the difference between the video signal of one pixel of the image n+1 and the video signal of the identically arranged pixel of the image n that preceded in time, and $s^2$ being an estimated variance or an empirical value for the variance of the differential camera-noise process.

Furthermore, a threshold So, which is used for the comparison to the change, is input when no threshold can be set yet because of a lack of results, as is the case for the first block.

The method for calculating the threshold T is input via the entry keyboard 9 and selected as follows in this example:

$$T = T_s + T_v,$$

$T_s$ in the simplest case representing a constant and $T_v$ being equal to a sum, $\Sigma C_i$, which extends over all blocks i of the selected observation window 4. The coefficients $C_i$ are defined as follows: $C_i=0$, in the case that the storage address of the pixel contains a 0, or $C_i=B$, in the case that the storage address of the pixel contains a 1 and the block is a horizontal or vertical neighbor of the block 5 to be decided upon, or $C_i=C$, in the case that the storage address of the block contains a 1 and is a diagonal neighbor of the block 5 to be decided upon.

The threshold component $T_s$ is defined, for example, by the following formula:

$$T_s = T_{so} + 2(B+C).$$

The parameters $T_{so}$, B and C used for determining the threshold $T_s$ are input in this example with: B=12, C=6, and $T_{so}=55.1$. This corresponds to a significance probabilty a of $5 \times 10^{-4}$. Depending on the application, the constants B, C and $T_s$ can also assume other values. At the programming point 13, the image pick-up unit 3 records an image and the arithmetic unit 1 files the image by pixels in the storage device 2. At the programming point 15, the arithmetic unit 1 segments the filed image into blocks in accordance with the entries and selects the entered observation window 4 for the first block 5 to be decided upon.

This example is depicted in FIG. 2: the block 5 to be decided upon is darkly shaded in image n+1. The observation window 4 follows from the adjacent blocks, which are drawn in as hatch-shaded and edged blocks in FIG. 2. Since results of a comparison with a threshold do not exist for all adjacent blocks of the image n+1, the method falls back upon the corresponding frames of image n, which are likewise hatch-shaded and edged, to determine the threshold. If one considers the selected observation window 4, which contains the blocks 110, 120, 130, and 140 of the image n+1 and the blocks 150, 160, 170, and 180 of the image n, the blocks 110, 120, 130, 140, 170, and 180 having been designated as changed and the blocks 150 and 160 as not changed, then the following threshold T results:

$$T = T_s - T_v = T_{so} + 2(B+C) - \Sigma C_i.$$

Given the same evaluation of the blocks of image n+1 and of image n, it results for $\Sigma C_i$ for the image n+1: 2B+2C and for the image n: B+C. Thus, it follows for the threshold that:

$$T = T_{so} + 2(B+C) - 3B - 3C = T_{so} - B - C.$$

At the programming point 19, in accordance with the statistics filed at the programming point 11, the arithmetic unit 1 formulates the difference between the video signals of the block 5 to be compared and the video signals of the identically arranged block 6 of the preceding image n.

In this example, the change was defined as $$\Delta_k = (1/s^2) \Sigma d_i^2.$$

In place of the squares of the differential signals $d_i$, the amounts $|d_i|$ can also be used with the initial factor $2\sqrt{2}$ and can then be scaled to the standard deviation s. The change is compared to the threshold T, which had been determined in the programming point 17. At the programming point 21, the arithmetic unit 1 assigns a 1 to the storage addresses of the pixels of the block 5 to be compared when the change is greater than the threshold T and, in the other cases, a 0. Storage addresses are filed in the storage device 2 for the pixels of the stored images. The query is made by the arithmetic unit 1 at the programming point 23 whether all pixels or blocks of the image n+1 have been compared to a threshold T. If this is not the case, operation returns to the programming point 15, and a further block is compared to a threshold in accordance with the programming points 15 through 21. If the query reveals at the programming point 23 that all the blocks of the image have been compared to a threshold, then operation branches over to programming point 25. At the programming point 25, the arithmetic unit 1 selects those blocks which had been recognized as moving objects.

From those values which are filed in the storage addresses of the blocks, the arithmetic unit 1 determines contiguous moving objects. Moving vehicles are ascertained in this manner, for example, by means of automatic video surveillance.

Preferably, the threshold T for the comparison to the change can be set for a block having the size 1×1 pixels, and then only the result of the same block in the image n is considered with respect to the threshold, as follows: $T=T_s+T_v$, $T_s$ being a constant value and $T_v$ representing a variable value. For the case that the observation window has not changed, the threshold T is greater than $T_s$, and for the case that the observation window has changed, the threshold T is smaller than $T_s$. The value $T_s$ is determined by the setpoint selection of a significance probability a, which represents a measure for estimating probability: $\text{prob}(d_i^2 > T_s | H_0) = a$, for the case that the square sum is drawn upon as a statistic for changing the block. The determination and the meaning of the significance probability a is described by Bronstein in "Handbook of Mathematics", Teubner Publishers, pp. 677, et seq. For the case that the absolute sum is applied as a statistic, the following significance probability results:

$$\text{prob}(2\sqrt{2}|d_i| > T_s | H_0) = a.$$

To calculate the probability in the case of the square sum, one draws upon a $\chi^2$-distribution having a degree of freedom and, in the case of the absolute sum, a $\chi^2$-distribution having two degrees of freedom, as clarified by Bronstein in "Handbook of Mathematics", Teubner Publishers, pp. 686, et seq. $T_v$ is determined as follows:

$$T_v = 2\ln[p(l_k|Ho)/p(l_k|Hl)],$$

$p(1_k|Hl)$ denoting an empirical value for the probability that the correct decision $l_k$ in the predecessor image precedes a correct designation of "changed" (i.e., pixel has changed) for the block to be decided upon in the image n+1, and $p(l_k|HO)$ denoting an empirical value for the probability that the correct decision $l_k$ in the predecessor image n precedes a correct designation of in the image n+1, $p(l_k=\text{changed}|Hl) \gg p(l_k=\text{not changed}|Hl)$, and $p(l_k=\text{not changed}|Ho) \gg p(l_k=\text{changed}|Ho)$ applying.

Thus, T depends upon $l_k$, i.e., $$T(l_k) = T_s + T_v(l_k).$$

In the case that the block is larger than 1×1 pixels, the thresholds $T(l_k)$ are transformed in that two significance probabilities $a(l_k)$ are produced in accordance with $\text{prob}(d^2_k > T(l_k)|Ho) = a(l_k)$, or $\text{prob}(2\sqrt{2}|d_k| > T(l_k)|Ho) = a(l_k)$.

From this then, on the basis of prob $(\Delta_k T(l_k)|Ho) = a(l_k)$, the decision thresholds $T(l_k=\text{not changed})$ and $T(l_k=\text{changed})$ can be determined for larger blocks.

A further development of the method of the present invention that is quite significant in practice is that constants, statistics and calculation methods required in the execution of the program are filed in the storage device 2 to allow the computer program to be executed without user input.

What is claimed is:

1. A method for detecting at least one change in an electronically recorded moving image, the image including first and second blocks, each of the first and second blocks including at least one pixel, the method comprising the steps of:

determining the change in the first block of the image by comparing the first block with a correspondingly positioned block of at least one preceding image;

selecting an observation window within the image, the observation window including the first block and the second block, the second block having had a prior change previously determined and compared to a prior change threshold;

determining a change threshold in dependence upon whether the prior change in the second block is greater than the prior change threshold;

comparing the change in the first block to the change threshold; and storing one of at least two values for each pixel of the first block in dependence upon whether the change in the first block is greater than the change threshold.

2. The method according to claim 1, wherein the change threshold is determined in further dependence on a location of the second block relative to the first block.

3. The method according to claim 1, wherein the step of determining the change in the first block includes calculating a sum of squared differences between video signals of corresponding pixels in the first block and in the correspondingly positioned block of the at least one preceding image and at least one of scaling the sum and multiplying the change threshold by an output variance of a camera noise.

4. The method according to claim 1, wherein the step of determining the change in the first block includes calculating a sum of absolute values of differences between video signals of corresponding pixels in the first block and in the correspondingly positioned block of the at least one preceding image and at least one of scaling the sum and multiplying the change threshold by an output variance of a camera noise.

5. The method according to claim 1, wherein the change threshold is determined in further dependence on whether a change in the correspondingly positioned block of the at least one preceding image is greater than a further prior change threshold.

6. The method according to claim 1, wherein the step of determining the change threshold includes combining a fixed threshold component and a variable threshold component, the variable threshold component being determined in dependence upon whether the prior change in the second block is greater than the prior change threshold.

7. The method according to claim 1, wherein the change in the first block is determined using a subset of the pixels included in the first block.

8. The method according to claim 1, wherein the second block is adjacent to the first block.

9. The method according to claim 8, wherein the observation window includes a third block in the at least one preceding image and wherein the change threshold is determined in further dependence on the third block in the at least one preceding image.

* * * * *